United States Patent

Brekau et al.

[11] Patent Number: 5,964,693
[45] Date of Patent: Oct. 12, 1999

[54] CONTINUOUS PREPARATION OF SILICA SOLS WHICH CONTAIN LARGE PARTICLES

[75] Inventors: Uwe Brekau, Cologne; Hans-Dieter Block, Leverkusen; Hans-Heinrich Moretto, Leverkusen; Peter Schmidt, Leverkusen; Peter Schober, Leverkusen; Werner Ludovici, Odenthal, all of Germany

[73] Assignee: Bayer Aktiengesellschaft, Leverkusen, Germany

[21] Appl. No.: 08/067,308

[22] Filed: May 26, 1993

[30] Foreign Application Priority Data

Jun. 3, 1992 [DE] Germany ............................. 42 18 306

[51] Int. Cl.$^6$ ................................................... C01B 33/14
[52] U.S. Cl. .............................. 516/82; 516/83; 423/335
[58] Field of Search ...................... 423/324, 335, 423/338; 502/8, 232; 252/313 S, 313.1, 313.2; 516/83, 82

[56] References Cited

U.S. PATENT DOCUMENTS

| | | | |
|---|---|---|---|
| 2,244,325 | 6/1941 | Bird | 252/313 S |
| 2,574,902 | 11/1951 | Bechtold et al. | 252/313 S |
| 2,680,721 | 6/1954 | Broge et al. | 252/313 S |
| 2,871,099 | 1/1959 | Ziese | 423/338 |
| 3,012,972 | 12/1961 | Rule | 252/313 S |
| 3,440,174 | 4/1969 | Albrecht | 252/313 S |
| 3,440,175 | 4/1969 | Weldes et al. | 252/313 S |
| 3,440,176 | 4/1969 | Sippel | 252/313 |
| 3,462,374 | 8/1969 | Klosak | 252/313 |
| 3,468,813 | 9/1969 | Mindick et al. | 252/313 |
| 3,538,015 | 11/1970 | Mindick et al. | 252/313 |
| 3,673,104 | 6/1972 | Albrecht | 252/313 S |
| 3,756,958 | 9/1973 | Iler | 252/313 S |
| 3,947,376 | 3/1976 | Albrecht | 252/313 S |
| 3,959,174 | 5/1976 | Winyall et al. | 252/317 |
| 4,336,234 | 6/1982 | Leutner et al. | 423/329 |
| 4,356,107 | 10/1982 | Payne | 252/313 S |
| 4,775,520 | 10/1988 | Unger et al. | 423/335 |
| 5,215,733 | 6/1993 | Potter | 423/338 |
| 5,236,623 | 8/1993 | Chevallier | 252/313.2 |

FOREIGN PATENT DOCUMENTS

| | | | |
|---|---|---|---|
| 726149 | 1/1966 | Canada | 252/313.2 |
| 0170578 | 2/1986 | European Pat. Off. | |

OTHER PUBLICATIONS

R.K. Iler, "The Chemistry of Silica", Wileg, NY pp. 334–347, (1979).
G.W. Sears, Jr., "Determination of Specific . . . Sodium Hydroxide", Analytical Chemistry, vol. 28, No. 12, Dec. (1956).

Primary Examiner—Gary P. Straub
Assistant Examiner—Timothy C. Vanoy
Attorney, Agent, or Firm—Sprung Kramer Schaefer & Briscoe

[57] ABSTRACT

A process is provided for the preparation of aqueous silica sols having a particle size of 27 to 72 nm. by adding fresh acidic silica sol into the reactors of a multi stage cascade reactor wherein the reactors contain aqueous solution of colloidal silica sol of a pH of 8 or above. Each successive stage of the cascade reactor is supplied with overflow from the preceding stage. Alkaline compounds, such as alkaline sodium silicate solution, alkaline potassium silicate solution, sodium hydroxide solution or potassium hydroxide solution, are introduced into the first reactor or first reactors so that a pH value in the range of 8 to 12.5 is established in the reactors.

1 Claim, No Drawings

CONTINUOUS PREPARATION OF SILICA SOLS WHICH CONTAIN LARGE PARTICLES

The invention relates to a process for the preparation of silica sols which contain non-aggregated, spherical $SiO_2$ particles with a mean diameter of 27–72 nm, in which an acidic, active solution of a silicate is added continuously to an alkaline silica sol at atmospheric pressure.

For many industrial applications, such as e.g. high temperature binders, stable, $SiO_2$-containing products in the form of sols, so-called silica sols, are required. The active component in the product, $SiO_2$, must be present at a relatively high concentration in the form of discrete, spherical, non-aggregated particles. The advantage of such a product, in which the active component is present at high concentrations is obvious: the transport and storage costs, for example, are in direct proportion to the $SiO_2$ concentration of the product.

Recently, there has been an increased demand for silica sols with a large average particle diameter (>25 nm). In many applications, e.g. in the polishing of silicon wafers, the effectiveness of the product correlates with the size of the silica sol particles which are colloidally dispersed in the liquid carrier. However, hitherto there has been no process which permits the direct preparation of this type of particle size (>25 nm) from acidic fresh sol in a simple and economically viable, continuous method of working in simple, non-pressurized apparatus Corresponding to the increased importance of silica sols containing large particles, many attempts have been undertaken to make suitable methods of preparation available. As a result of these endeavors, products with average particle diameters of up to 36 nm have come onto the market. However, to prepare these particles, complicated, multistage processes have to be performed initially, in which an alkaline pre-product, which for its part has been prepared beforehand from acidic fresh sol, has to undergo further treatment.

Thus, for example, to prepare products containing large particles, an alkaline silica sol which contains small particles in a diluted form (2–20 wt. % of $SiO_2$) is treated under pressure at 138–370° C. in a batch process (U.S. Pat. No. 3,012,972). U.S. Pat. No. 4,356,107 also describes further treatment of an alkaline silica sol in a batch process at high pressures and temperatures.

A continuous process is claimed in U.S. Pat. No. 2,680,721. In this process, an alkaline silica sol which contains small particles is heated in a continuous pressurized loop for an interval of time determined from batch tests at temperatures between 160° C. and 300° C.

The disadvantages of the process described above are the high cost of apparatus due to working under pressure and at elevated temperatures and the complicated method of working which involves several product stages.

An important advance in the process, which had to start with the addition of acidic freshly made sol, is offered by alkaline silica sols. This saves the step for the separate production of alkaline silica sol containing small particles, as compared with the previously described process.

Thus DE-OS 1,667,645 describes the preparation of a silica sol with an average particle diameter of 15–150 nm and a $SiO_2$ content of 45–55 wt. % Here, water is evaporated from an aqueous, alkaline solution at elevated pressure (472–9443 kPa), wherein an acidic, active silica sol, which contains particles with an average diameter of less than 5 nm, is simultaneously added in order to maintain a constant volume.

DE-OS 1,667,675 describes a discontinuous process for the preparation of silica sols with a low sodium content and an increased particle size. In this process acidic fresh sol is added to the starting medium of an alkaline silica sol and sodium silicate solution is introduced in such a manner that the pH value is between 8.5 and 9.5. Concentration is carried out by the evaporation of water.

Successful attempts to produce silica sol with large particles from acidic fresh sol have also been undertaken at atmospheric pressure. U.S. Pat. No. 3,440,174, U.S. Pat. No. 3,673,104 and U.S. Pat. No. 3,947,376 describe single-stage batch processes for the preparation of alkaline silica sols in preferably aqueous medium with a $SiO_2$ content of at least 35 wt. %. The $SiO_2$ particles in the process described there have an average diameter of 45–100 nm, are spherical and are non-aggregated.

A disadvantage of this process is that the initial sol is used at a very dilute concentration and thus long reaction times and large amounts of energy are required to achieve commercially viable concentrations. Another disadvantage is the batchwise method of working which is not economically advantageous.

Since the concentrations of $SiO_2$, active silicate and sodium ions, the pH and the particle size are constantly altering during the course of a batch process, transposition of this method of working to a continuous method of working with the operational parameters remaining unchanged over the course of time, as is characteristic of continuous processes, is not possible and accordingly is neither performed nor described.

Due to the enormous economic and industrial advantages of a continuous process which is not performed under pressure, tests have been carried out to make such continuous processes available. However, it has not been possible to produce silica sols which contain large particles continuously in a simple manner.

Continuous processes for the preparation of silica sols from acidic fresh sol are described for example in U.S. Pat. No. 3,440,175. Here silica sols which contain particles with diameters of up to at most 40 nm are prepared. Again, in U.S. Pat. No. 2,574,902, a continuous method of working is described briefly without, however, detailing the process parameters.

Thus it has not hitherto been possible to prepare alkaline silica sols with predeterminable, average particle sizes of 25–75 nm by a simple, non-pressurised, continuous process.

Therefore the object was to make available a continuous process which permits the economic preparation of large amounts of silica sols with specific, predeterminable, average particle sizes of 25–75 nm, in which the disadvantages of the known processes, mentioned above, such as elevated temperatures and pressures, long reaction times, highly diluted solutions and complicated, batchwise methods of working do not occur and where simple parameter adjustment enables the preparation of silica sols which contain large particles. This object was achieved by the process according to the invention.

The present invention provides a continuous process for the preparation of aqueous alkaline silica sols which contain non-aggregated, spherical $SiO_2$ particles with an average diameter of 27–72 nm, from an acidic fresh sol which contains 4–8% by weight of $SiO_2$ in the form of particles having an average particle diameter of about 2 nm at a pH value of 2–4 and which has been produced by mixing an alkali silicate solution with a cation exchange resin in the H-form, this acidic fresh sol is added to a starting medium containing an aqueous, alkaline, colloidal silica sol solution having a pH value of >8, a $SiO_2$ content of 2–20% by weight and an average particle size of 14–27 nm, alkaline agents are added simultaneously to this medium at temperatures near the boiling point thereof in such quantities that the pH value does not fall below 8 during the whole process, and the addition of acidic fresh sol and alkaline agents is continued until the particles have an average diameter of 27–72 nm and the aqueous, alkaline silica sols thus prepared are concentrated, characterised in that a) the acidic fresh sol is continuously introduced into the reactors of a multi-stage reaction cascade, in which the first stage contains the starting medium and each successive reactor in the cascade is supplied with overflow from the preceding reactor, and the pH value in the reactors must not fall below 8, b) alkaline agents, preferably alkaline sodium silicate solution, alkaline potassium silicate solution, sodium hydroxide solution, potassium hydroxide solution, are continuously introduced into the first reactor or into the first reactors in such quantities that a pH value of 8 to 12.5 is established in the reactors thus charged, c) the average residence times in the stages of the reaction cascade charged with acidic fresh sol are adjusted in such a manner that an average particle size of 27–72 nm is obtained in the last reactor of the cascade.

Stationary operating conditions are adjusted in the reactors during the process according to the invention, these conditions being as follows in a cascade comprising for example five reactors:

|  | pH value | particle size [nm] | average residence time [h] | average $SiO_2$ concentration [% by weight] |
|---|---|---|---|---|
| first reactor | 10.7–11.7 | 14–27 | 0.5–2 | 9–16 |
| second reactor | 9.8–11.3 | 15–41 | 0.5–2 | 11–30 |
| third reactor | 9.9–10.8 | 18–49 | 0.5–2 | 16–40 |
| fourth reactor | 9.4–10.5 | 20–68 | 1.5–2 | 22–45 |
| fifth reactor | 9.0–10.5 | 27–72 | 1.5–2 | 28–50 |

The concentrations in the reactors are adjusted by evaporating off a quantity of water which is less than that introduced.

For the preferred working temperature region, at about the boiling point of water, the average residence time required in all the reactors charged with fresh sol, to achieve the desired specific surface area, is determined by the relationship:

residence time [in hrs]=14.5–1/9 (specific surface area [in $m^2/g$]).

Starting compounds for the process according to the invention are acidic fresh sol and alkaline agents. The acidic fresh sols to be used in the process according to the invention normally have average particle diameters of less than 5 nm, a pH preferably between 2 and 3 and $SiO_2$ concentrations of 4–8 wt. %, preferably 6.0 to 6.3 wt. %. To prepare the aforementioned acidic fresh sols which contain small particles, appropriately diluted soda water glass solution is treated with strongly acidic cation exchange resins, as is described in U.S. Pat. No. 2,244,325 and U.S. Pat. No. 3,468,813.

Although the process for the preparation of acidic fresh sols which is described in the these U.S. patents is preferred, any other suitable methods for the preparation of an acidic silica sol with the requisite particle size and the desired pH may be used.

The average particle size D of the particles is calculated from the specific surface area O as determined by G. W. Sears' method (Analytical Chemistry, vol. 28, p. 1981–1983, 1956) using the following formula (see R. K. Iler, "The Chemistry of Silica", Wiley, New York 1979):

$$D = \frac{6}{f \times O} \times 1000$$

Here, D is the average diameter of a spread of surface areas in nm, O is the specific surface area in $m^2/g$ and f is the density of the $SiO_2$ particles in g/ml. As a simplification, the ideal density of amorphous $SiO_2$, 2.2 g/ml, is used in the calculation.

The creation of spatially separated, stationary states with respect to pH, average particle size, $Na_2O$ content and $SiO_2$ concentration, in the form of reactors in a multi-stage apparatus, is very important for implementation of the process according to the invention.

A further important parameter in the process is the average residence time in these reactors. Of particular significance is the residence time in any reactors to which fresh sol is added, because the growth process to give larger particles takes place preferentially there. The average residence time is controlled by the amount of water which has evaporated or which is to be evaporated and by the addition of fresh sol to each of the reactors.

The apparatus which is used in the process according to the invention consists of several, at least 2, overflow reactors which are arranged in sequence and which are connected to each other. The contents of each reaction vessel are thoroughly mixed. Specific amounts of distillate are carried away from the reactors by suitable sources of heat. The addition of the feed materials, fresh sol and alkaline agent, to the reactors takes place using metering devices, into at least the first two reactors in the direction of material flow.

In order to increase the storage stability, i.e. the period of time over which the acidic fresh sol can be stored, cooling of the aforementioned solution to temperatures of 0–15° C., preferably 4–10° C., has to be applied.

To guarantee a specific pH and to reduce gelling, alkaline agent is added during the course of the process. Addition may take place to all reactors, but preferably to the first. A metal hydroxide, or metal silicate solution, preferably sodium silicate, potassium silicate, sodium hydroxide or potassium hydroxide solution, is used. Sodium silicate solution, for example with 27 wt. % of $SiO_2$ and 8 wt. % of $Na_2O$, corresponding to a ratio by weight of $SiO_2:Na_2O$ of ca. 3.35, has to be diluted with deionized water for easier handling. Dilution preferably takes place down to a concentration of ca. 6 wt. % of $SiO_2$.

On starting up the reactor cascade, the previously described, and characterizing for the invention, stationary states with regard to pH, average residence time, particle size and $SiO_2$ concentration have to be set up. When starting up, it is not necessary to fill all the reactors in the multi-stage apparatus with suitable stock sols. It is sufficient to have or to produce a suitable stock sol in the first reactor.

Using the process according to the invention, concentrated, aqueous, stable, alkaline silica sols which contain more than 30 wt. % of $SiO_2$ may be prepared. The particles in the silica sols obtainable from the process according to the invention are large, spherical, uniform and non-aggregated.

Tests on the silica sols prepared in the process according to the invention show that these products possess viscosities of less than 10 mPas, measured with a Höppler falling ball viscometer, at a temperature of 20° C. and a $SiO_2$ content of 30 wt. % The prepared products have a viscosity of 1.5–9 mPas, a pH between 8 and 10.5 and a $Na_2O$ content in solution of <0.1 wt. %. The silica sols are storage stable at +80° C. for at least 10 weeks without any change in viscosity.

The invention is explained in more detail in the following illustrative examples:

EXAMPLE 1

The apparatus which is used here and in the following examples consists of five overflow reactors made from glass arranged in sequence and connected to each other. The volume of the reactors is measured up to the overflow point at boiling point and is 783 ml for the first reactor, 617 ml for the second reactor, 644 ml for the third reactor, 1174 ml for the fourth reactor and 1308 ml for the fifth reactor.

The contents of each reaction vessel are thoroughly stirred with propeller stirrers. Heating the contents of the reactor is performed indirectly using steam. For this purpose, metal coils made from VA steel are placed in the interior of the reactors. The spent steam is passed through a water condenser, condensed and then measured. The vapor pressure of the heating steam, with which the amount of water being distilled out of the individual reactors has to be regulated, is maintained at a constant value using a suitable needle valve and a corresponding condensate separator.

The heating coils in the reactors are joined in parallel and connected to a main steam pipe. Each of the previously described five reactors is provided with its own condensate separator, in order to be able to evaporate different fixed amounts of water from each reactor.

To each of the five reactors is added a solution of acidic fresh sol, prepared, for example, as in U.S. Pat. No. 2,244,325, using an addition device. The addition device is chosen so that addition may take place to individual, selected reactors. Addition of the solution of alkaline agent, such as e.g. metal hydroxide or metal silicate solution, preferably a solution of sodium silicate, to all the reactors is also possible using a metering device.

In order to increase the storage stability, i.e. the period of time over which the acidic solution of the active silicate is capable of being stored, the said solution of fresh silica sol is cooled to temperatures of 4–10° C.

The stationary state in the five reactors is maintained with an average residence time of 1.8 hrs in the first reactor, 1.7 hrs in the second and third reactors and 2 hrs in the fourth and fifth reactors by the addition of 960 ml fresh silica sol containing 6 wt. % of $SiO_2$ per hour to each of the five reactors and 105 ml of dilute alkaline soda water glass per hour (containing 6 wt. % of $SiO_2$) to the first reactor and by evaporating the following amounts of water: 634 ml/h in the first reactor, 1030 ml/h in the second reactor, 950 ml/h in the third reactor, 737 ml/h in the fourth reactor and 900 ml/h in the fifth reactor. The average overall residence time is accordingly 9.2 hrs.

In the steady operational state in the continuously operating apparatus there are then specific pH values for all five reactors. The pH in the first reactor is 11.2, in the second reactor is 10.8, in the third reactor is 10.3, and in each of the fourth and fifth reactors is 9.9. The $SiO_2$ concentrations in the sols in the steady state is 14 wt. % in the first reactor, 29 wt. % in the second reactor, 39 wt. % in the third reactor, 34 wt. % in the fourth reactor and 37 wt. % in the fifth reactor.

The specific surface area of the sol is adjusted to 172 $m^2/g$ in the first reactor, 92 $m^2/g$ in the second reactor, 69 $m^2/g$ in the third reactor, 54 $m^2/g$ in the fourth reactor and 53 $m^2/g$ in the fifth reactor (corresponding to an average particle diameter of 51 nm).

The specific surface area of the silica sol obtained during a total of 80 operating hours under these conditions was 50 $m^2/g$. The pH was 9.9, the viscosity was 3.5 mPas at 20° C. and 30 wt. % of $SiO_2$.

EXAMPLE 2

The stationary state in the five reactors is maintained with an average residence time of 1.9 hrs in the first reactor, 0.8 hrs in the second reactor, 0.7 hrs in the third reactor, 0.9 hrs in the fourth reactor and 2.1 hrs in the fifth reactor. The average overall residence time in all the reactors is 6.4 hrs.

To set the residence times, 963 ml/h of fresh silica sol with 6 wt. % of $SiO_2$ are added to the first reactor, 1277 ml/h to the second reactor, 1259 ml/h to the third reactor, and 1293 ml/h to the fourth reactor. Furthermore, the following amounts of water are evaporated from the reactors: 651 ml/h from the first reactor, 952 ml/h from the second reactor 1125 ml/h from the third reactor, 807 ml/h from the fourth reactor and 738 ml/h from the fifth reactor. 106 ml/h of soda water glass solution containing 6 wt. % of $SiO_2$ were metered into the first reactor.

The $SiO_2$ concentrations in the unit are 15 wt. % in the first reactor, 18 wt. % in the second reactor, 23 wt. % in the third reactor, 20 wt. % in the fourth reactor and 39 wt. % in the fifth reactor.

The product prepared under these trial conditions has a specific surface area of 75 $m^2/g$ (corresponding to an average particle diameter of 36 nm), a pH of 9.5, a $SiO_2$ content of 39 wt. % and a viscosity of 3.5 mPas, measured at 20° C. and with 30 wt. % $SiO_2$. The product is very low in alkali, having an $Na_2O$ content of less than 0.1 wt. %.

To start up the reaction cascade each time, the first reactor is filled with the saved contents of the first reactor from the last operating period to prepare the silica sols as in Example 1 or 2.

The stationary operating state as in Example 1 (stock sol from Example 1) or Example 2 (stock sol from Example 2) is set by adding the amounts of fresh sol and soda water glass and by evaporating off the specific amounts of water, and the 2nd reactor is filled via the overflow. When the 2nd reactor has been filled, the steady state is set here and the next reactor is filled via the overflow, and so on. All five reactors in the cascade are filled in this way and appropriate stock sols are prepared in all the reactors.

EXAMPLE 3 (preparation of the stock)

Silica sol, Levasil 100/30%® (manufacturer: Bayer AG, Leverkusen), with a $SiO_2$ content of 30–31 wt. % of $SiO_2$, a pH of 9.5–10.5, a viscosity of <3 mPas, a density of 1.202–1.210 g/ml, a specific surface area of 100–135 $m^2/g$ and an alkalinity of 0.12–0.18 wt. % of $Na_2O$ is diluted to a $SiO_2$ content of 2.3 wt. % of $SiO_2$ using deionized water. 10.960 l of this diluted solution were treated with 220 ml of concentrated soda water glass containing 27 wt. % $SiO_2$ and 8.0 wt. % $Na_2O$ corresponding to a ratio by weight of $SiO_2:Na_2O$ of ca. 3.35, at room temperature and with stirring.

The stock sol produced in this way is placed in the first reactor in the 5-stage reaction cascade. Next, to set the steady operating state in the first reactor, a specific amount of water is evaporated off per hour and an accurately determined amount of fresh silica sol (containing 6 wt. % of $SiO_2$) and soda water glass solution is added. The second reactor is filled via the overflow and then the steady state with regard to pH, average residence time, particle size and $SiO_2$ concentration is set there by adding a specific amount of fresh sol per hour and distilling off a specific amount of water. The next reactor is filled via the overflow, and so on. The amounts of distillate and fresh sol which are required to set the steady states are given in Tables 1 and 2 below, along with the specific surface area of a silica sol obtained under these conditions after at most 5 average residence times, and also the characteristic quantities which characterize the steady operating states.

TABLE 1

| Reactor | Distillate [ml/h] | Fresh sol [ml/h] | pH | $SiO_2$ content [wt. %] | BET [$m^2/g$] |
|---|---|---|---|---|---|
| 1 | 634 | 960 | 11.2 | 14 | 172 |
| 2 | 1030 | 960 | 10.8 | 29 | 92 |
| 3 | 950 | 960 | 10.3 | 39 | 69 |
| 4 | 737 | 960 | 9.9 | 34 | 54 |
| 5 | 900 | 960 | 9.9 | 37 | 53 |

Added to reactor 1: 105 ml/h of soda water glass solution, containing 6 wt. % of $SiO_2$.

TABLE 2

| Reactor | Distillate [ml/h] | Fresh sol [ml/h] | $SiO_2$ concentration [wt. %] |
|---|---|---|---|
| 1 | 651 | 963 | 15 |
| 2 | 952 | 1277 | 18 |
| 3 | 1125 | 1259 | 23 |
| 4 | 807 | 1293 | 20 |
| 5 | 738 | — | 39 |

Added to reactor 1: 106 ml/h of soda water glass solution, containing 6 wt. % of $SiO_2$.
Ratio $SiO_2$:$Na_2O$ = 1:3.3.

It will be understood that the specification and examples are illustrative but not limitative of the present invention and that other embodiments within the spirit and scope of the invention will suggest themselves to those skilled in the art.

What is claimed is:

1. A continuous process for the preparation of aqueous alkaline silica sols which contain non-aggregated, spherical $SiO_2$ particles with an average diameter of 27–72 nm, from an acidic fresh sol which contains 4–8% by weight of $SiO_2$ in the form of particles having an average particle diameter of about 2 nm at a pH value of 2–4 and which has been prepared by mixing an alkali silicate solution with a cation exchanger resin in the H-form, this acidic fresh sol is added to a starting medium containing an aqueous, alkaline, colloidal silica sol solution having a pH value of >8, a $SiO_2$ content of 2–20% by weight and an average particle size of 14–27 nm, alkaline agents are added to this medium at temperatures near the boiling point thereof in such quantities that the pH value does not fall below 8 during the whole process, and the addition of acidic fresh sol and alkaline agents is continued until the particles have an average diameter of 27–72 nm and the aqueous, alkaline silica sols thus prepared are concentrated, wherein a) the acidic fresh sol is continuously introduced into the reactors of a multi-stage reaction cascade, in which the first stage contains the starting medium and each successive reactor of the cascade is supplied with overflow from the preceding reactor, and the pH value in the reactors is maintained at 8 or above, b) alkaline agents selected from the group consisting of an alkaline metal hydroxide and an alkaline metal silicate solution are continuously introduced into the first reactor or into the first reactors in such a quantity that a pH value of 8 to 12.5 is established in the reactors thus charged, c) the average residence times in the stages of the reaction cascade charged with acidic fresh sol are adjusted in such a manner that an average particle size of 27–72 nm is obtained in the last reactor of the cascade.

* * * * *